April 13, 1965  S. M. PHELPS  3,178,683
CROSSING PROTECTION SYSTEM
Filed Sept. 26, 1960  3 Sheets-Sheet 1

INVENTOR.
S.M. PHELPS
BY
Forest B. Hitchock
HIS ATTORNEY

April 13, 1965    S. M. PHELPS    3,178,683
CROSSING PROTECTION SYSTEM
Filed Sept. 26, 1960    3 Sheets-Sheet 2

FIG. 2.

INVENTOR.
S. M. PHELPS
BY
Forest B. Hitchcock
HIS ATTORNEY

INVENTOR.
S.M. PHELPS
BY
Forest B. Hitchcock
HIS ATTORNEY

United States Patent Office 3,178,683
Patented Apr. 13, 1965

3,178,683
CROSSING PROTECTION SYSTEM
Stuart M. Phelps, Rochester, N.Y., assignor to General Signal Corporation, a corporation of New York
Filed Sept. 26, 1960, Ser. No. 58,459
4 Claims. (Cl. 340—31)

This invention relates to a crossing protection system, and, more particularly, pertains to such a system for insuring that one type of movable conveyance travelling over one defined route has an unobstructed path of travel through an intersection made with another defined route over which different types of movable conveyances normally travel.

In many complex installations, irrespective of the public or private nature thereof, wherein movable conveyances are employed which have priority of travel over defined routes, the problem of assuring that such priority of travel is at all times observed in view of other defined routes intersecting therewith is, at times, unduly critical. Installations of this type may include, for example, a mining installation where certain vehicles provided for carrying that which is extracted from the mine is accorded priority of travel in and/or from the mine; an airport having taxiways connecting the runways and ramps which are intersected by service vehicle roads where taxiing aircraft are accorded priority of travel; or a plant installation where explosives are manufactured which are transported in and/or from the plant by means of vehicles such as trucks with those vehicles being accorded priority of travel. In such installations, the number of movable conveyances accorded priority of travel through respective intersections usually exceeds the number of other movable conveyances also using the intersections.

Attempts have been made in the past in order to overcome the problem of assuring priority of travel in the many varied installations where such priority of travel is required. One such attempt was to employ stop signs which prompted the operators of secondary conveyances to be more attentive to the traffic conditions at the intersections. Another attempt was to provide a gate in a normal obstructing position which was controllable to an unobstructing position by an operator being appropriately located so as to observe the traffic conditions at the intersection. In each of these attempts, however, it is the apparent practice to rely on human judgment as to the traffic conditions at an intersection for permitting the secondary conveyances to pass through the intersection. It is also apparent that under adverse weather conditions, and even during normal or good weather conditions, human judgment in this connection may be somewhat remiss and, thus, a costly accident could occur.

Described briefly, the present invention proposes to provide a system which will automatically assure priority of travel to movable conveyances over a defined route having such priority accorded thereto. More particularly, it is proposed in the present invention to provide a normally obstructing gate at the intersection of two defined routes and, in particular, in the path of travel over one defined route of the movable conveyances not having priority of travel to enforce stoppage thereof. The normally obstructing gates being located at the entrance of the intersection are operated to an unobstructing position for a certain allotted time according to the presence of a movable conveyance at that location and in the presence of a detection means. The present invention further proposes a system which permits the gates to be operated to an unobstructing position only provided that the defined route provided for the type of movable conveyance having priority of travel is free of all such movable conveyances in a detection zone including the intersection. Thus the gates are controlled in accordance with occupancy storage means that detects and stores a condition of occupancy of the route having priority. This invention further proposes that the presence of at least one movable conveyance having priority travel in a detection zone including the intersection is effective to cause the gates to be locked in an obstructing position and to remain in such obstructing position as long as the movable conveyance is within the detection zone with respective indications of the condition including locking of the gates being provided for the instruction of the operators of the movable conveyances concerned.

The present invention presents several advantages which have been heretofore unattainable by the prior attempts to overcome this problem. One such advantage is that each movable conveyance traversing a defined route and approaching the defined route over which movable conveyances having priority of travel traverse are forced to come to a complete stop irrespective of human judgment of traffic conditions at the intersection thereof. Another advantage of this invention is that the gates located in approach to the one defined route are locked in an obstructing position provided that at least one movable conveyance is present within the detection zone which is defined on the one defined route and includes the intersection of the two defined routes.

Thus, one object of this invention is to provide a system for insuring that one conveyance has an unobstructed path of travel over one defined route and at an intersection made with another defined route irrespective of movable conveyances present on such another defined route.

Another object of this invention is to provide a system for enforcing each movable conveyance deemed as having a secondary importance and travelling over one defined route to stop at the intersection made with another defined route for a distinct interval.

Another object of this invention is to provide a system which shall enforce each movable conveyance to stop prior to entering an intersection of two defined routes when an element of the system fails to properly operate and to remain in this position until authorized to traverse the intersection irrespective of the presence of a movable conveyance in the detection zone.

Another object of this invention is to provide a system which shall detect the presence of a movable conveyance in a detection zone including the intersection and cause an indication to be rendered for indicating that the gates are locked in obstructing positions.

Another object of this invention is to provide a system for detecting movable conveyances of varying sizes in approach to a normally obstructing gate so as to control the gate to an unobstructing position for only each movable conveyance according to the absence of another movable conveyance from the detection zone.

Other objects, purposes and characteristic features of the present invention will be in part obvious from the accompanying drawings, and in part pointed out as the description of the invention progresses.

For the purpose of simplifying the illustrations and facilitating in the explanation, the various parts and circuits constituting the embodiments of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice. The symbols (+) and (—) are employed to indicate the positive and negative terminals, respectively, of suitable batteries, or other sources of direct current; and the circuits with which these symbols are used always have current flowing in the same direction.

In describing the invention in detail, reference will be made to the accompanying drawings, in which like reference characters designate corresponding parts throughout the several views; and in which:

FIG. 2 shows two defined routes adapted to movable conveyance travel thereover and illustrating another embodiment of this invention therewith.

It has been stated above that this invention is applicable to many varied installations where priority of travel is accorded to one particular group of movable conveyances. One of these installations briefly mentioned relates to an airport which includes taxiways connecting the runways and ramps intersected by service vehicle roads. In order that fuller comprehension of this invention may be had by the following description, it is considered expedient to describe the embodiments of the present invention with respect to an airport, and, more particularly, to a portion of a taxiway and a portion of a service vehicle road at the intersection thereof.

System apparatus

Figure 1:
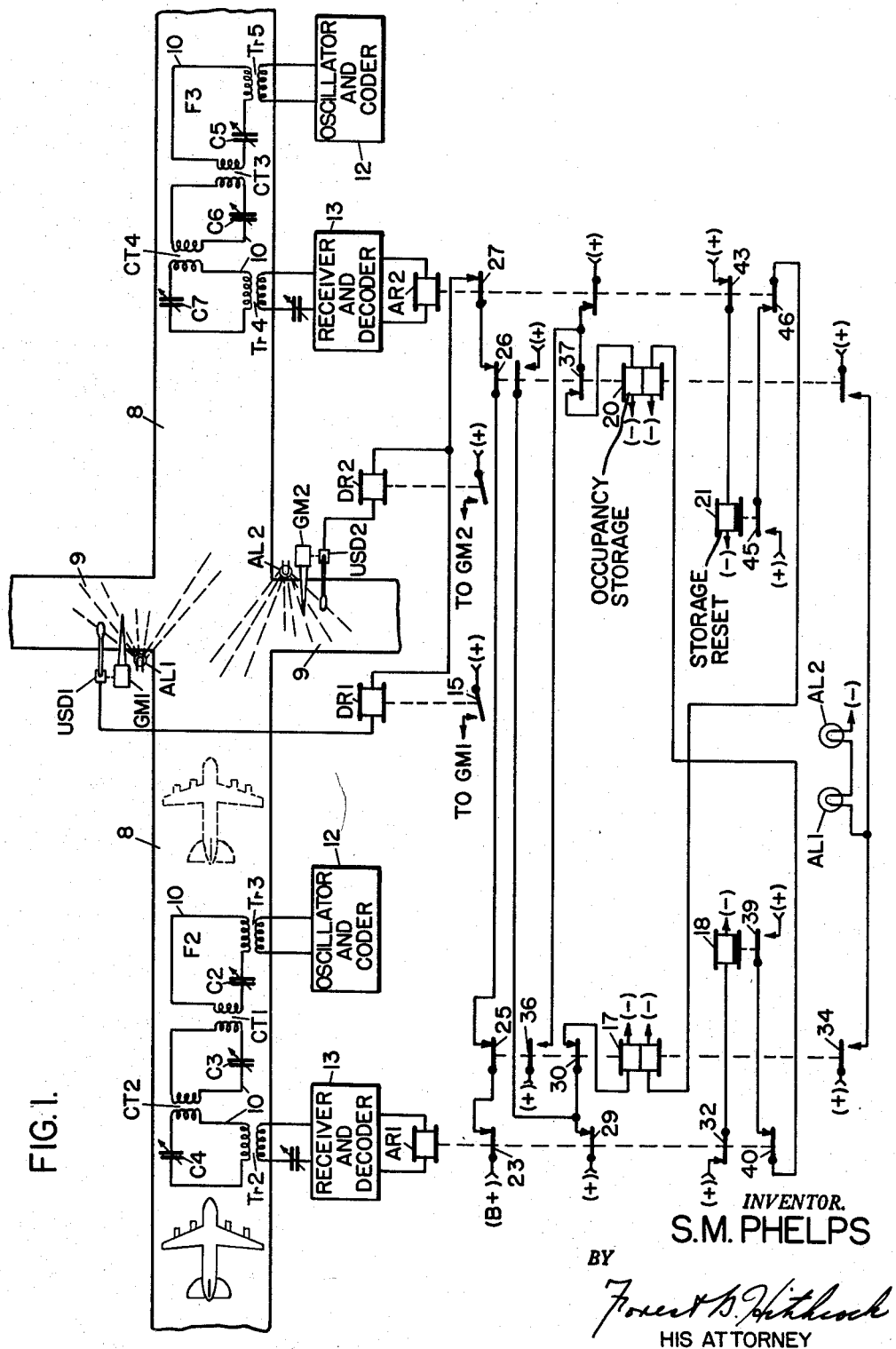
FIG. 1 shows two defined routes adapted to movable conveyance travel thereover and illustrating one embodiment of this invention therewith.
Figure 3:
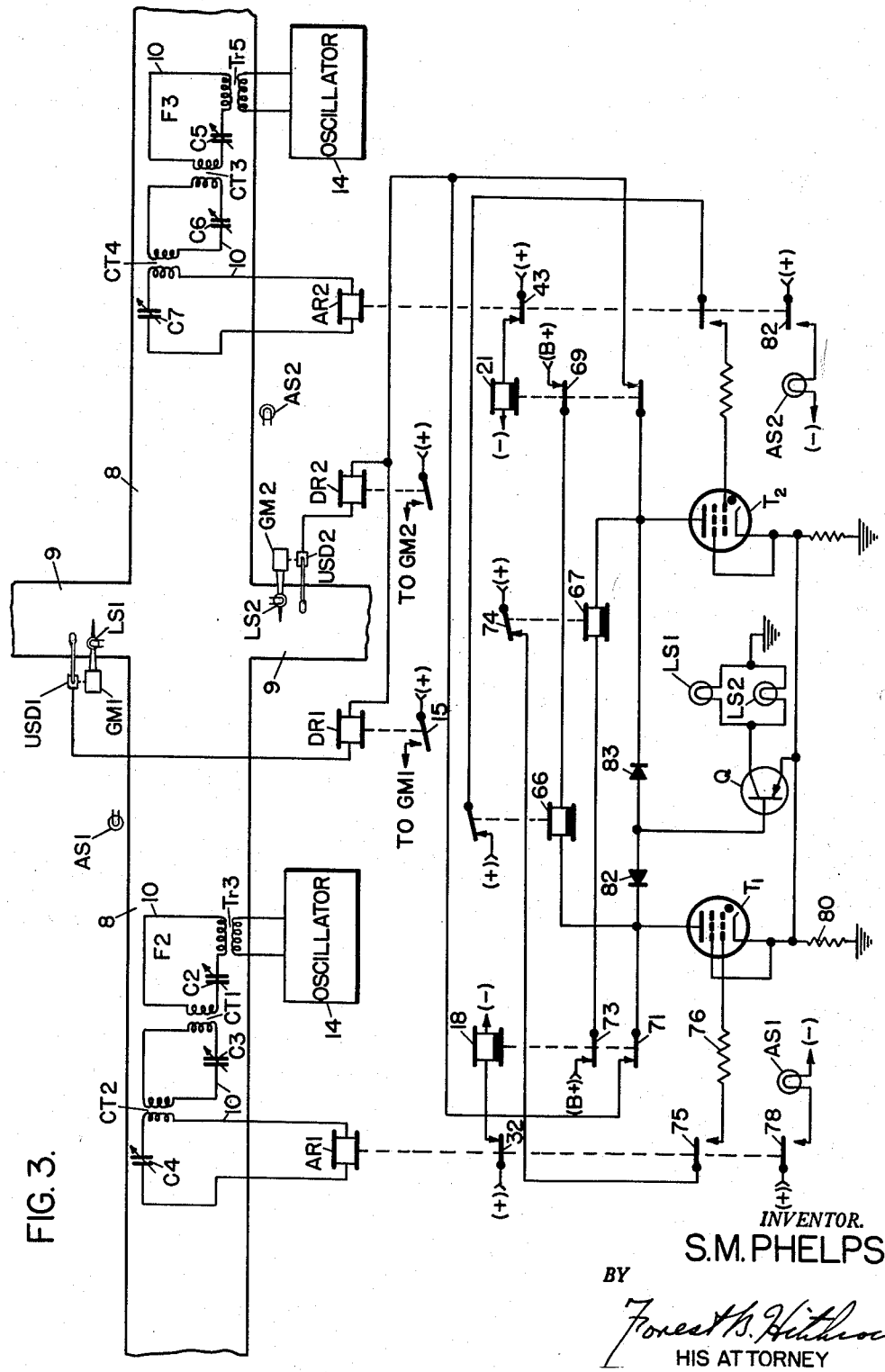
FIG. 3 shows two defined routes adapted to movable conveyance travel thereover and illustrating still another embodiment of this invention therewith.

With respect to FIGS. 1, 2 and 3, it will be noted that each includes an illustration of a portion of a taxiway 8 and a portion of a service vehicle road 9 at the intersection thereof. On either side of the taxiway 8, there is illustrated a coil type detection circuit organization, both circuit organizations being effective to define a detection zone including the intersection of taxiway 8 and service vehicle road 9. In approach to the taxiway 8 in opposite directions to the intersection thereof and disposed adjacent to the service vehicle road 9, a gate mechanism GM having an arm is provided for enforcing each service vehicle approaching the taxiway 8 to stop before entering the intersection. To effect the control of the arm for the gate mechanism GM to an unobstructing position, an ultrasonic detector USD is provided for detecting the presence of each service vehicle which is forced to come to a complete stop thereunder.

The coil type detection circuit organization shown as being employed for detecting a moving aircraft on the taxiway 8 on either side of the intersection made with the service vehicle road 9 may be of the type shown in the Patent No. 2,488,815 granted to W. D. Hailes on November 22, 1949. In general, each coil type detection circuit organization includes three coils 10 which are magnetically interconnected by coupling transformers CT, one of the outer coils 10 being connected to a transmitting oscillator and coder 12 through a transformer Tr while the opposite outside coil 10 is connected to a receiver and decoder 13 through another transformer Tr. Each of the coil 10 includes a condenser C connected therein which enables each coil type detection circuit organization to be tuned to one specific frequency for causing the operation of a relay connected to the receiver and decoder 13. The general operation of each coil type detection circuit organization is such that sufficient current is coupled from the transmitting oscillator and coder 12 to the receiver and decoder 13 to maintain the relay connected thereto energized, while the presence of at least one aircraft in any one of the three coils 10 causes a detuning of the coil type detection circuit organization to cause the relay to be deenergized. For convenience, the coil 10, transformers Tr and CT, and condensers C shown for each coil type detection circuit organization have reference characters which are similar to those employed in the Patent No. 2,488,815 granted to W. D. Hailes.

The gate mechanism GM employed on either side of the taxiway 8 and disposed adjacent to the service vehicle road 9 is of the type shown in the Patent No. 2,310,716 granted to J. E. Stephenson on February 9, 1943. In general, this type of gate mechanism is operated wholly electrically through a motor and suitable gearing to its two positions according to the presence or absence of control energy supplied to the motor control circuit. In each of the FIGS. 1, 2 and 3, the arm for each of the gate mechanisms GM is shown to be in an obstructing position and is further shown to be a short arm, i.e., the length of the arm is such as to obstruct only approximately half of the width of the service vehicle road 9. This length of the gate mechanism arm is desirable inasmuch as it is within the scope of the present invention to enforce the service vehicles approaching the taxiway 8 to stop before entering the intersection, but to provide an unobstructed path of travel for the service vehicles on the road 9 after leaving the intersection.

Each of the ultrasonic detectors USD provided for detecting the presence of a service vehicle which is forced to stop by the associated gate mechanism GM may be of the type disclosed in Patent No. 3,045,909 granted to J. H. Auer, Jr. on July 24, 1962. In general, an ultrasonic detector is shown and described in this Patent No. 3,045,909 which employs a beam of ultrasonic energy to detect and differentiate between vehicles or other randomly occurring objects travelling along a defined path. The invention disclosed in this Patnt No. 3,045,909, also provides that only one output is effected for each vehicle coming within the presence of the beam of ultrasonic energy regardless of the particular character of the vehicle or the number of its axles or wheels. In this respect, this type of ultrasonic detector is readily applicable to this invention inasmuch as the service vheicles are usually of a dissimiliar character.

In order that some indication be rendered to denote that the presence of an aircraft within the detection zone defined by the coil type detection circuit organizations is detected and that the arms of the gate mechanisms GM are locked in an obstructing position, a plurality of indication devices are disposed in various relationships with the taxiway 8 and service vehicle road 9 for providing this indication to the concerned operators. It will be observed that, with reference to FIGS. 1, 2 and 3 a lamp type indication device is shown in each case. It should be understood, however, that in other applications of the present invention, it may be more desirable to provide some other type of indication device such as a sound producing device for serving the same function of the lamps employed herein as mentioned above.

In order that the presence of at least one aircraft in the detection zone defined by the coil type detection circuit organization is effective to lock the arms of the gate mechanisms GM in an obstructing position during the interval that an aircraft is within the confines of the detection zone, a control circuit organization is provided which is responsive to the operation of the relays connected to the respective receivers and decoders 13 included with the coil type detection circuit organizations. Such control circuit organization may take the forms shown in the embodiments of the present invention in FIGS. 1, 2 and 3. In general, two of these forms employ relays to effect the desired results, one being a type of circuit which causes the arms of the gate mechanisms GM to be locked in an obstructing position provided one of the elements becomes inoperative. Another form of the present invention shows the use of electronic tubes and a transistor in addition to relays for effecting the function of locking the arms of the gate mechanisms GM in an obstructing position according to the presence of an aircraft within the detection zone and providing a suitable indication to denote this effect.

General mode of operation

Irrespective of the specific control circuit organizations included in the embodiments of this invention as shown in FIGS. 1, 2 and 3, a mode of operation obtains which is common to these three embodiments. Thus, it is considered expedient to first view this invention from the area of a general operational description.

If it is assumed that a service vehicle is approaching the taxiway 8 over the road 9 in each direction, the presence of the service vehicles under the respective ultasonic detectors USD1 and USD2 will effect the energization of detection relays DR1 and DR2. It will be noted that the energization of detection relays DR1 and DR2 simultaneously or at different times causes a positive (+) potential to be supplied through a front contact thereof to the respective gate mechanism GM. For example, assuming that detection relay DR1 is caused to be energized according to the presence of a service vehicle under the ultrasonic detector USD1, a positive (+) potential is supplied to the gate mechanism GM1 through a front contact 15. Thus, as long as no aircraft are present within the defined detection zone, the arms for gate mechanisms GM1 and GM2 are each separately operated to an unobstructing position according to the presence of a service vehicle under the associated ultrasonic detectors USD1 and USD2.

If, however, it is assumed that at least one aircraft is entering the detection zone defined by the coil type detection circuit organizations from either end of the detection zone, the control circuit which supplies (B+) to one side of the detection relays DR1 and DR2 is disconnected immediately following the detection of an aircraft by the coil type detection circuit organization first encountered. This control circuit remains disconnected during the interval that the aircraft is within the detection zone and until such aircraft has traversed the coil type detection circuit organization at the opposite end of the detection zone thus preventing the arms of either gate mechanism GM1 or GM2 from being operated to an unobstructing position. It will be noted that the detection relays DR1 and DR2 are indicated to be connected to the respective ultrasonic detectors USD1 and USD2. In this connection, these relays DR1 and DR2 are each connected in the plate circuit of an electronic tube (not shown) in the manner shown in the Patent No. 3,045,909 and are energized according to the conduction thereof.

Immediately following the entrance of the aircraft into the detection zone, the control circuit organization is also effective to cause the indication devices disposed in desirable positions and viewable from the taxiway 8 and the service vehicle road 9 to become illuminated and to remain illuminated until the aircraft exits from the detection zone over the code type detection circuit organization at the opposite end thereof. Thus, an indication for denoting that the arms of gate mechanisms GM1 and GM2 can not be operated from their obstructing positions is given while an aircraft is within the confines of the detection zone.

With this general description in mind, the specific control circuit organizations included in the embodiments of this invention shown in FIGS. 1, 2 and 3 will now be described in more detail.

Embodiment of FIG. 1

Referring to FIG. 1, it is seen that each coil type detection circuit organization has a double winding type relay associated therewith which is normally held energized according to the energized condition of the relay associated with the receiver. Also, a single winding slow release type relay is associated with each coil type detection circuit organization and is normally held energized according to the energized condition of the relay associated with the receiver and decoder 13. The relays 17 and 18 are of these two types and associated with the coil type detection circuit organization illustrated as being employed with the taxiway 8 to the left of the road 9, while the corresponding relays 20 and 21 are associated with the coil type detection circuit organization illustrated as being employed with the taxiway 8 to the right of the road 9.

One function of each of the relays 17 and 20 is to disconnect the (B+) control energy from energizing circuits for relays DR1 and DR2 which are controlled by ultrasonic detectors USD1 and USD2 respectively to lock the gates GM1 and GM2 in their normally closed positions. Another function of relays 17 and 20 is that each relay provides energy to maintain the other relay energized through a back contact. The function of each of the relays 18 and 21 is to insure that the relays 17 and 20 are respectively restored to their energized positions, dependent upon the direction of traffic on the roadway when an aircraft leaves the area of the intersection.

Approach lights AL1 and AL2 are disposed adjacent the taxiway 8 and road 9 in the vicinity of the respective gate mechanisms GM1 and GM2 and they are visible to traffic on both routes in approach of the intersection for providing an indication as to the locked condition of the gate mechanisms GM1 and GM2. The approach lights AL1 and AL2 are both caused to be illuminated by providing control energy through a back contact of either the relay 17 or relay 20 and they remain illuminated, denoting that an aircraft is within the detection zone and the gate mechanisms GM1 and GM2 are locked, until the aircraft has exited from the detection zone.

As long as the detection zone is free of aircraft, control energy is supplied to one side of the relays DR1 and DR2 by a circuit extending from (B+), through front contact 23 of approach relay AR1, through front contact 25 of relay 17, through front contact 26 of relay 20, through front contact 27 of approach relay AR2, to one side of each of the relays DR1 and DR2. Thus, as long as this circuit is completed, the presence of a service vehicle which is detected by either ultrasonic detector USD1 or ultrasonic detector USD2 causes the arms of the gate mechanism GM1 and GM2 to be respectively operated to an unobstructing position for allowing the passage of the detected service vehicles.

If, however, it is assumed that an aircraft is approaching the intersection from the left, this control energy will be disconnected according to the deenergization of relay 17. More particularly, when the coil type detection circuit organization is detuned by the presence of the aircraft, the current supplied to the approach relay AR1 is insufficient to maintain this relay energized. Thus, relay AR1 is deenergized for the interval in which an aircraft effectively detunes the associated coil type detection circuit organization. As soon as the relay AR1 is deenergized, a circuit normally maintaining relay 17 energized, generally known as a locking circuit, is opened. This circuit extends from (+), through front contact 29 of relay AR1, through front contact 30 of relay 17, through the upper winding of relay 17, to (—). The energizing circuit for relay 18 which extends from (+), through front contact 32 of relay AR1, through the winding of relay 18, to (—) is disconnected and relay 18 is deenergized. The deenergization of relay 17 causes the approach lights AL1 and AL2 to be energized by connecting a circuit extending from (+), through back contact 34 of relay 17, through the filaments of approach lights AL1 and AL2, to (—).

The deenergization of relays 17 and 18 are effective to control relay 20 according to the presence and absence of the aircraft over the coil type detection circuit organization to the left of road 9. In this connection, another stick circuit is provided for relay 20 which extends from (+), through back contact 36 of relay 17, through front contact 37 of relay 20, through the upper winding of relay 20, to (—). After the assumed aircraft has left the presence of the coil type detection circuit organization and proceeded further into the detection zone, the relay AR1 is once again energized. Before the relay 18 is energized through front contact 32 of relay AR1, however, a circuit is completed to the lower winding of relay 20 which extends from (+), through back contact 39 of relay 18, through front contact 40 of relay AR1, through the lower winding of relay 20, to (—). It will be seen that the slow release characteristics of relay 18 are effective at this point to provide that the circuit is completed through its back contact 39 for a sufficient time to insure that the relay 20 is energized.

Assuming that the aircraft proceeds through the detection zone and approaches the coil type detection circuit organization associated with the taxiway 8 to the right of the road 9, the presence of such aircraft thereat detunes the coil type detection circuit organization and subsequently causes relay AR2 to be deenergized. The relay 20 is maintained energized during the time that the aircraft is effective to cause relay AR2 to be deenergized because of its stick circuit which includes back contact 36 of relay 17. The deenergization of relay AR2 is effective, however, to cause the reenergization of relay 17. More particularly, the energizing circuit for relay 21 which extends from (+), through front contact 43 of relay AR2, through the winding of relay 21, to (—) is disconnected for the interval that the aircraft effectively causes the relay AR2 to be deenergized. Thus, the relay 21 is deenergized and because of its slow release characteristics, a suitable interval is required when the relay AR2 is once again energized in order for the relay 21 to become energized. During this interval, an energizing circuit is completed for the relay 17 which extends from (+), through back contact 45 of relay 21, through front contact 46 of relay AR2, through the lower winding of relay 17, to (—). When the relay 17 is once again energized, the control circuit for the approach lights AL1 and AL2 is disconnected to cause these lights to be deenergized.

The movement of the aircraft out of the detection zone thus causes the relay 17 to be again energized which consequently reestablishes the circuit for connecting (B+) to the relays DR1 and DR2. The presence of a service vehicle under ultrasonic detector USD1 and/or USD2 is effective to cause the gate mechanisms GM1 and GM2 to be respectively controlled for causing the arms thereof to be operated to an unobstructing position for allowing passage of the service vehicles.

If it is assumed that an aircraft is entering the detection zone from the right of road 9, the relay 20 would be deenergized and reenergized in a similar manner to that described for relay 17, thus affecting the control of the gate mechanisms GM1 and GM2 and operation of the approach lights AL1 and AL2.

*Embodiment of FIG. 2*

The form of this invention shown in FIG. 2 differs from that shown in FIG. 1 and described above in that a magnetic stick type relay is employed in lieu of each of the double winding type relays 17 and 20. More particularly, with reference to FIG. 2, magnetic stick type relays 50 and 51 are shown as being normally deenergized. Each of these relays 50 and 51 is effectively energized according to the direction of an aircraft entering the detection zone as defined by the coil type detection circuit organizations for disconnecting the (B+) control energy from the relays DR1 and DR2. The manner in which these relays 50 and 51 are controlled in effecting this operation is thus different from that described for relays 17 and 20.

For normal operation of the gate mechanisms GM1 and GM2, (B+) control energy is supplied to the plate circuit of the electronic tubes (not shown) employed in the ultrasonic detectors USD1 and USD2 through a circuit extending from (B+), through front contact 23 of relay AR1, through back contact 54 of relay 50, through back contact 55 of relay 51, through front contact 27 of relay AR2, to one side of the relays DR1 and DR2, and to the electronic tubes (not shown) included in the ultrasonic detectors USD1 and USD2.

If it is assumed that an aircraft comes within the presence of the coil type detection circuit organization employed with the taxiway 8 to the left of road 9, the relay AR1 is effectively deenergized for the interval that the aircraft is effective to detune the coil type detection circuit organization. The relay 18 is deenergized a predetermined time following the release of relay AR1 which time is determined by its slow release characteristic. Before relay 18 is deenergized, however, an energizing circuit for relay 50 is established which extends from (+), through front contact 58 of relay 18, through back contact 59 of relay AR1, through back contact 60 of relay 51, through the upper winding of relay 50, to (—). As soon as the relay 18 is energized, this circuit is disconnected. Inasmuch as the relay 50 is of a magnetic stick type, it will remain energized until a circuit is completed for causing its deenergization. Subsequent to the energization of relay 50, a circuit is established for causing the illumination of approach lights AL1 and AL2 which extends from (+), through front contact 63 of relay 50, through the filaments of approach lights AL1 and AL2, to (—). These circuit conditions obtain after the aircraft leaves the presence of the coil type detection circuit organization employed with the taxiway 8 to the left of road 9 and proceeds on the taxiway 8 and through the intersection made with the road 9 and until such plane comes within the presence of the coil type detection circuit organization employed with taxiway 8 to the right of road 9.

When the coil type detection circuit organization employed with taxiway 8 to the right of road 9 is effectively detuned, the relay AR2 is effectively deenergized. Subsequent to the deenergization of relay AR2, relay 21 having its energizing circuit connected through front contact 43 of relay AR2 is effectively deenergized. When the assumed plane leaves the presence of this coil type detection circuit organization, the relay AR2 is again effectively energized. Before relay 21 is again energized, a deenergizing circuit for relay 50 is established which extends from (+), through back contact 45 of relay 21, through front contact 46 of relay AR2, through the deenergizing winding of relay 50, to (—). The circuit for supplying (+) to the relays DR1 and DR2 is once again established through back contact 54 of relay 50.

If it is assumed that an aircraft enters the detection zone on taxiway 8 to the right of road 9, the relay 51 is energized in lieu of relay 50 to effectively disconnect the (B+) control energy from the relays DR1 and DR2 through its back contact 55. The operations for effecting the energization and deenergization of relay 51 and thus the approach lights AL1 and AL2 are similar to those described above for relay 50.

*Embodiment of FIG. 3*

Before proceeding with the description of the control circuit organization included in the form of this invention shown in FIG. 3, it is considered necessary to note the differences in the coil type detection circuit organizations and the number of indication devices from that described above. More particularly, each of the coil type detection circuit organizations employs only a transmitting oscillator 14 and has the associated approach relay AR directly connected to one of the coils 10. The W. D. Hailes Patent No. 2,488,815 discloses that this organization may be employed in lieu of the coder and decoder type of circuit organization where the current supplied to the relay AR is not a critical value.

In lieu of the approach lights AL1 and AL2 as described above, it may be desirable to provide indication lights separate for the operators of service vehicles and for the operators of moving aircraft. In this respect, the lock signals LS1 and LS2 are shown as being associated with the arms of the gate mechanisms GM1 and GM2, while the approach signals AS1 and AS2 are disposed adjacent the taxiway 8 and in close proximity to the respective coil type detection circuit organizations.

The functions of the approach lights AL1 and AL2 are thus provided respectively by the lock signals LS1 and LS2 and the approach signals AS1 and AS2.

In order that the (B+) control energy may be effectively disconnected from the relays DR1 and DR2, the form of this invention shown in FIG. 3 employs two thyratrons T1 and T2 and relays 66 and 67 connected in their respective plate circuits in addition to relays 18 and 21 described above. The operation of the approach signals AS1 and AS2 are dependent upon the respective approach relays AR1 and AR2, while the lock signals LS1 and LS2 are dependent upon the conductive condition of either thyratron T1 or T2.

Under normal conditions, i.e., when the detection zone is free of aircraft, (B+) control energy is supplied to the electronic tubes (not shown) included in ultrasonic detectors USD1 and USD2 through two circuits. One circuit, for example, extends from (+), through front contact 69 of relay 21, through the winding of relay 66, through front contact 71 of relay 18, through the windings of relays DR1 and DR2, to the elecrtonic tubes (not shown) included in ultrasonic detectors USD1 and USD2. When a vehicle is detected by either ultrasonic detector USD1 or ultrasonic detector USD2, the respective gate mechanism GM1 or GM2 is controlled to operate its arm to an unobstructing position for allowing that vehicle to enter the intersection. In this respect, relay 66 or relay 67 may be energized, but the energization thereof has no effect upon the thyratron tubes T1 or T2.

If it is assumed, however, that an aircraft is entering the detection zone via the code type detection circuit organization employed with the taxiway 8 at the left of road 9, the thyratron T1 is effectively placed in a conducting state to disconnect the (B+) control energy from the relays DR1 and DR2. More particularly, as soon as the aircraft is detected, relay AR1 is effectively deenergized which deenergization disconnects the energizing circuit for relay 18. Subsequent to the deenergization of relay 18, (B+) control energy which is normally supplied to the relays DR1 and DR2 through the two circuits which include front contacts 71 and 73 of relay 18 is disconnected therefrom. In order that the (B+) control energy remains disconnected as long as the aircraft is within the detection zone, thyratron T1 is placed in a conductive state following the deenergization of relay AR1. In this respect, (+) is supplied to the control grid of thyratron T1 from a circuit extending from (+), through back contact 74 of relay 67, through back contact 75 of relay AR1, through a resistor 76, to the control grid of thyratron T1. When the aircraft exits from the coil type detection circuit organization, relays AR1 and 18 are reenergized and the control grid energizing circuit is disconnected. The thyratron T1 remains, however, in a conductive state because of its characteristics until such time as its (+) plate supply voltage is removed.

The approach signal AS1 and lock signals LS1 and LS2 are caused to be illuminated as a result of, respectively, the energization of relay AR1 and the conductive state of thyratron T1. More particularly, the energizing circuit extending from (+), through back contact 78 of relay AR1, through the filament of approach signal AS1, to (−) causes the illumination of approach signal AS1 as long as relay AR1 is deenergized. This interval of illumination for approach signal AS1 is sufficiently long to indicate to the operator of the aircraft that the aircraft has been detected.

The lock signals LS1 and L32 are connected in the collector circuit of a transistor Q while the base electrode and emitter electrode are connected to the plate and cathode circuits respectively of thyratrons T1 and T2. In the nonconducting states of thyratrons T1 and T2, both the emitter and collector circuits are grounded which prevents transistor Q from entering into a conductive state even though the base electrode thereof is placed at a negative (−) potential. When, however, thyratron T1 is placed in a conductive state, the emitter electrode thereof is placed at a positive (+) potential as a result of the voltage drop across resistor 80, while the base electrode is placed at a negative (−) potential as a result of a voltage drop across the winding of relay 66. Under these conditions, the transistor Q is placed in a conductive state which causes current to flow through the filaments of lock signals LS1 and LS2 to cause the illumination thereof. It will be noted that (B+) connected in the plate circuit of thyratron T2 is effectively blocked from the base electrode of transistor Q by diode 83 while diode 82 is connected in a direction to pass a negative (−) potential thereto.

When the assumed aircraft moves through the intersection and is detected by the code type detection circuit organization employed with the taxiway 8 to the right of road 9, the relay AR2 is effectively deenergized. Subsequent to the deenergization of relay AR2, the energizing circuit including front contact 43 of relay AR2 is disconnected for the relay 21 which is thus deenergized. The deenergization of relay 21 causes the (B+) plate supply to be removed from the plate circuit of thyratron T1 as a result of contact 69 being opened which causes thyratron T1 to become nonconductive. In order that the thyratron T2 remain on the non-conductive state, it is understood that the total time required for relays 21 and 66 to become deenergized exceeds the interval that relay AR2 is deenergized. Also, the approach signal AS2 is caused to be illuminated during the interval that relay AR2 is deenergized through its back contact 82. This illumination of approach signal AS2 is coincidental according to the direction in which the assumed aircraft is travelling.

If it is assumed that an aircraft is travelling in the opposite direction and enters the detection zone through the coil type detection circuit organization employed with the taxiway 8 to the right of road 9, the thyratron T2 is placed in a conductive state which causes the energization of relay 67. While the aircraft is within the detection zone, (B+) control energy is removed from the relays DR1 and DR2 in the manner described above while the signals AS1, AS2, LS1 and LS2 are caused to be illuminated in a similar manner.

Having described three specific forms of this invention, it is desired to be understood that these forms are selected to facilitate in the disclosure of this invention rather than to limit the number of forms which it may assume; and, it is to be further understood that various modifications, adaptations and alterations may be applied to the specific forms shown to meet the requirements of practice, without in any manner departing from the spirit or scope of this invention.

What I claim is:

1. In a system for regulating traffic flow through an intersection of a first route having priority of travel with a second route, gate obstruction means disposed for normally blocking traffic flow from each approach of said second rate into said intersection, detection means disposed in advance of said gate obstruction means on each approach of said second route for detecting each vehicle appearing on said second route, control means responsive to said detection means for each vehicle detected thereby to operate said gate obstruction means for that approach from its obstructing position for permitting passage thereby of the detected vehicle, vehicle detector means disposed in each approach to said intersection on said first route and spaced therefrom to define a portion of said first route on each side of said intersection in which each passing vehicle is detected, storage means operable to a storage condition in response to one vehicle detector means when detecting a vehicle and operable from said storage condition in response to the other vehicle detector means when detecting that vehicle, and circuit means responsive to said storage means operated to its storage condition for interrupting the control of said control means by said vehicle detection means for each approach of said second route until said storage means is operated from said storage condition.

2. The system as claimed in claim 1 and further including an indication device positioned in proximity to each said gate obstruction means, circuit means responsive to said storage means in its storage condition for controlling each such indication device for providing an indication on each approach of said second route to indicate that each said gate obstruction means is locked in a blocking position.

3. The system according to claim 1 and further including an indication device positioned between each of said vehicle detector means and said intersection in proximity to said first route, circuit means individual to each of said vehicle detector means responsive to its corresponding vehicle detector means during the detection of a vehicle thereby for indicating that such vehicle is in the detection portion defined by that vehicle detector means.

4. The system as claimed in claim 1 in which each of said vehicle detector means includes a plurality of coils positioned in said first route for defining the vehicle detection portion thereof and detector relay means controlled responsive to the presence of a vehicle over any portion of the plurality of coils for detecting that vehicle, said storage means being operable to its storage condition upon control of one detector relay means for one of said vehicle detector means and being operable from its storage condition upon control of the other detector relay means for the other of said vehicle detector means, and said circuit means including a circuit at least having a contact of said one detector relay means and a contact of said other detector relay means for controlling said detection means in response to vehicle detection on said second route, whereby the operation of said one detector relay means and said other detector relay means interrupts control of said detection means.

References Cited by the Examiner
UNITED STATES PATENTS

| | | | |
|---|---|---|---|
| 1,215,157 | 2/17 | Husk | 340—36 |
| 1,591,626 | 7/26 | Hood | 246—125 |
| 2,488,815 | 11/49 | Hailes | 340—38 |

NEIL C. READ, *Primary Examiner.*

ROBERT H. ROSE, THOMAS B. HABECKER,
*Examiners.*